United States Patent [19]

Chen

[11] Patent Number: 5,698,966
[45] Date of Patent: Dec. 16, 1997

[54] TEMPERATURE LIMITING DEVICE FOR TERMINATING BATTERY-CHARGING WITH PARALLEL DISCHARGING PATH FOR ELIMINATING POWER-OUTPUT INTERRUPTIONS

[75] Inventor: Shu-Chin Chen, Hsinchu Hsien, Taiwan

[73] Assignee: Mobius Green Energy, Inc., Santa Clara, Calif.

[21] Appl. No.: 630,844

[22] Filed: Apr. 11, 1996

[51] Int. Cl.$^6$ .................................................. H01M 10/46
[52] U.S. Cl. ......................................................... 320/35
[58] Field of Search ...................... 320/2, 5, 21, 25, 320/35, 36, 48; 429/61; 340/636; 324/431, 417

[56] References Cited

U.S. PATENT DOCUMENTS

| | | | |
|---|---|---|---|
| 4,507,368 | 3/1985 | Hashimoto | 429/62 |
| 4,636,704 | 1/1987 | Nakai | 320/35 |
| 4,680,527 | 7/1987 | Benenati et al. | 320/2 |
| 4,686,444 | 8/1987 | Park | 320/35 X |
| 5,247,238 | 9/1993 | Yang | 320/35 |

*Primary Examiner*—Edward Tso
*Attorney, Agent, or Firm*—Bo-In Lin

[57] ABSTRACT

The present invention discloses a thermal protection device which includes a temperature limiting switch such as a thermostat to switch off a charging loop to a rechargeable battery to prevent overheating in the cells of the rechargeable battery. The thermal protection device further includes a parallel loop for continuously conducting a discharging current when the charging loop is switched off. The parallel loop include a diode which allows current to flow only in the opposite direction of the charging current through the temperature limiting switch. The power output from the rechargeable batteries is therefore not affected by the switching on and off of the temperature limiting switch for controlling the charging operations.

8 Claims, 2 Drawing Sheets

TEMPERATURE LIMITING DEVICE FOR TERMINATING BATTERY-CHARGING WITH PARALLEL DISCHARGING PATH FOR ELIMINATING POWER-OUTPUT INTERRUPTIONS

BACKGROUND OF THE INVENTION

1. Field of the Invention

This invention relates generally to the control device and method for thermal protection of a rechargeable battery from overheating in its charging cycle. More particularly, this invention relates to an improved control device and method for providing thermal protection for preventing a rechargeable battery from overheating in the charging cycle while allowing parallel discharging operation to take place thus allowing the battery to serve as a power supply source without interruption.

2. Description of the Prior Art

There is a continuous conflict between the need to prevent rechargeable batteries from overheating in the charging cycles and the requirement that rechargeable batteries are to continuously provide uninterrupted and reliable power supply for operating electronic devices such as notebook computers and cellular phones. The conflict between the operational convenience and thermal protection is caused by the fact that the power supply has to be cutoff when the battery temperature is raised beyond a predefined level. The unexpected and sudden interruptions of the operation of electronic devices, e.g., notebook computers or cellular phones, are not only very annoyed but often may cause severe and devastating consequences. For the sake of providing reliable power supply in using rechargeable batteries, thermal protection criteria are relaxed by elevating the charging cycle cutoff temperature thus eliminating power supply interruptions. In such practice, however, the reliable and continuous power supply from rechargeable batteries are obtained through the sacrifices made in thermal protection which often causes the shortening of the useful life cycles of rechargeable batteries.

The charging and discharging processes in a rechargeable battery are carried out through chemical reactions. The material properties of the electrodes and the processes of these chemical reactions in carrying out the charging and discharging cycles are temperature sensitive. The life of rechargeable batteries can be optimized by operating under a certain temperature range. Batteries operated at higher temperatures than the optimal temperature, usually during a charging cycle when the temperature is raised, will cause material degradation and reaction inefficiency thus leads to the decrease of life cycles of the rechargeable batteries due to the adverse effects caused by the overheating in battery cells. For that reason, when the temperature is raised over a certain temperature limit a thermal protect circuit is implemented to terminate the charging operation. FIG. 1 is a functional diagram showing the application of the thermal protection device employed in conventional rechargeable batteries. A temperature limiting switch such as a thermostat is connected in series in a close loop for providing a charging current when the temperature is below a limiting temperature. As the charging process causes the rise of the battery temperature to exceed the limiting temperature, the thermostat is actuated to switch off thus forms an open loop and terminates the charging operation.

However, the switching off of the temperature limiting device terminates not only the charging cycle, it also interrupts the power input to the electronic device which relies on the batteries to provide input voltage for continuous operation. Reliable power input for continuous and uninterrupted operations are utmost important for many rechargeable battery applications such as power supply to notebook computers, mob fie phones and many other portable electronic devices. In order to avoid sudden interruptions, the limiting temperature is often set at a very high level, e.g., 70° C., such that interruptions can never or rarely occur. However, as the batteries are allowed to operate at temperatures higher than the regular optimal range, e.g. 45° C., battery performance and life cycles are sacrificed for the sake of user operation conveniences.

Bush discloses in U.S. Pat. No. 5,070,427, entitled "Thermal Switch for Battery Protection" (issued on Dec. 3, 1991), a thermal protector which is responsive to each cell of a battery. The thermal protector is constructed as an elongated thermally conductive housing in thermal contact with each cell of the battery. It also contains a fusible material which melts when any cell reaches a set temperature and a switch in contact with the battery which is caused to open when the material melts. The thermal protector as disclosed would not provide a solution to overcome the difficulties of input power interruptions from a rechargeable battery during a charging cycle when the temperature of the rechargeable battery pack reaches a threshold value. Many prior art U.S. Pat. Nos. e.g., U.S. Pat. No. 5,237,481 (by Soo et al.), U.S. Pat. No. 5,206,778 (by Flynn et al.), U.S. Pat. No. 5,043,234 (by Tomantschger et al.), U.S. Pat. No. 4,780,598 (by Fahney et al.), U.S. Pat. No. 3,573,550 (by Parker et al.), and U.S. Pat. No. 3,488,573 (by Cavlgelli et al.), disclose circuits and switches of thermal protection devices. However, the techniques as disclosed are not applicable to resolve the above described difficulties often encountered by users of the rechargeable batteries.

Therefore, a need still exists in the art of circuit design for battery thermal protection to overcome this difficulty. The improved circuit configuration for thermal protection must provide better thermal protection for the battery such that no sacrifices of battery life cycles are necessary while providing uninterrupted reliable power input to users of external electronic devices.

SUMMARY OF THE PRESENT INVENTION

It is therefore an object of the present invention to provide a new thermal protection device and method for preventing overheating of rechargeable batteries without power output interruptions thus enabling those of ordinary skill in the art to overcome the aforementioned difficulties and limitations encountered in the prior art.

Specifically, it is an object of the present invention to provide a new thermal protection device and method which include a non-interrupted connecting means in parallel to a temperature limiting switching means, e.g., a thermostat, such that power output interruptions can be eliminated.

Another object of the present invention is to provide a new thermal protection device and method which includes a non-interrupted connecting means in parallel to a temperature limiting switching means, e.g., a thermostat, such that charging cycle cutoff temperature can be set at a lower temperature without concerns for the power output interruptions whereby longer battery life can be achieved.

Briefly, in a preferred embodiment, the present invention includes a thermal protection device for preventing a rechargeable battery from overheating during a charging cycle. The thermal protection device includes a temperature limiting switching means for connecting in series to a charging loop for switching off the charging loop when the rechargeable battery reaches a predefined temperature. The thermal protection device further includes a non-interrupted connecting means for connecting in parallel with the charging loop, the connecting means includes a diode connected in series therein for providing a discharging loop for the rechargeable battery. In a preferred embodiment, the temperature limiting switching means is a thermostat for switching off the charging loop when the rechargeable battery reaching the predefined temperature. In an alternate preferred embodiment, the thermostat for switching off the charging loop when the rechargeable battery reaching a predefined temperature between 45° C. to 55° C.

It is an advantage of the present invention that it provides a new thermal protection device and method which include a non-interrupted connecting means in parallel to a temperature limiting switching means, e.g., a thermostat, such that power output interruptions can be eliminated.

Another advantage of the present invention is that it provides a new thermal protection device and method which include a non-interrupted connecting means in parallel to a temperature limiting switching means, e.g., a thermostat, such that charging cycle cutoff temperature can be set at a lower temperature without concerns for the power output interruptions whereby longer battery life can be achieved.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
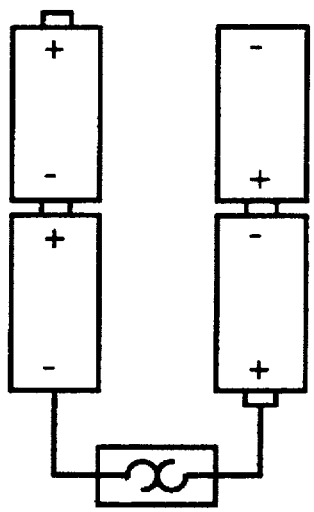
FIG. 1 is a functional block diagram showing a thermal protection device implemented in a set of rechargeable batteries employed in the prior art.
Figure 2A:
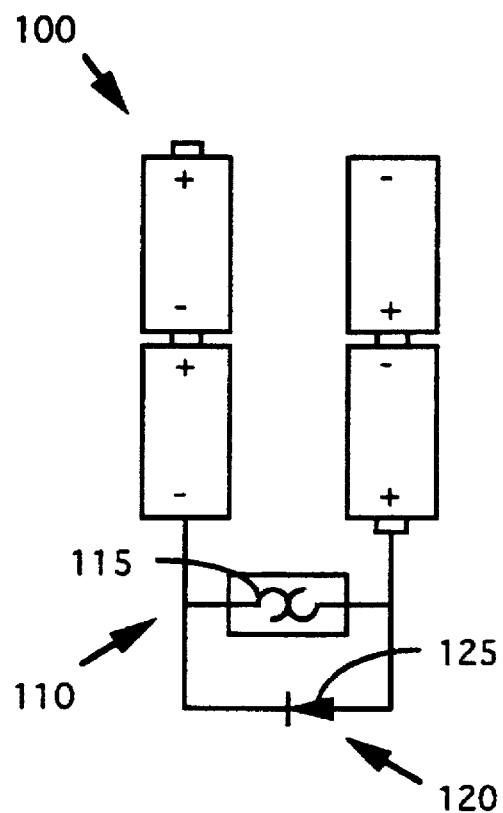
FIG. 2A is a functional block diagram showing a thermal protection device of the present invention implemented in a set of rechargeable batteries.

FIG. 2A is a block diagram showing a set of rechargeable batteries 100 provided with temperature limiting device 110 of the present invention. The temperature limiting device 110 is provided with a thermal switching means 115, e.g., a thermostat, which is switched to an off state to cutoff a charging current when the temperature of the battery exceeds a predefined upper temperature. The temperature limiting device 115 is used to terminate the charging cycle thus preventing the temperature of the battery to rise above a specific upper limit. The temperature limiting device 110 further includes a non-interrupting operation conducting means 120, e.g., a diode 125, which is connected in parallel with the temperature limiting device 115. The diode 125 is arranged to have a conducting path opposite to the charging current thus allowing a discharging current to conduct therein even when the thermal switching means, e.g., the thermostat 115, is switched off. The non-interrupting operation conducting means 120 including the diode 125 provides an alternate path to continue the operation of an electronic device (not shown) during the time when the temperature limiting device 110 is switched off.

Figure 2B:
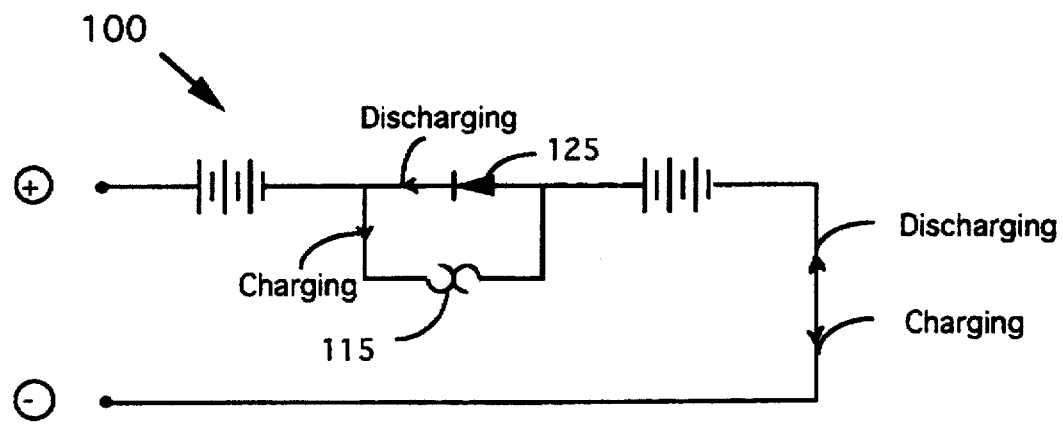
FIGS. 2B and 2C are circuit diagrams showing respectively the connectivity of the charging and discharging loops before and after the thermostat is switched off to protect the batteries from overheat during a charging cycle.
Figure 2C:
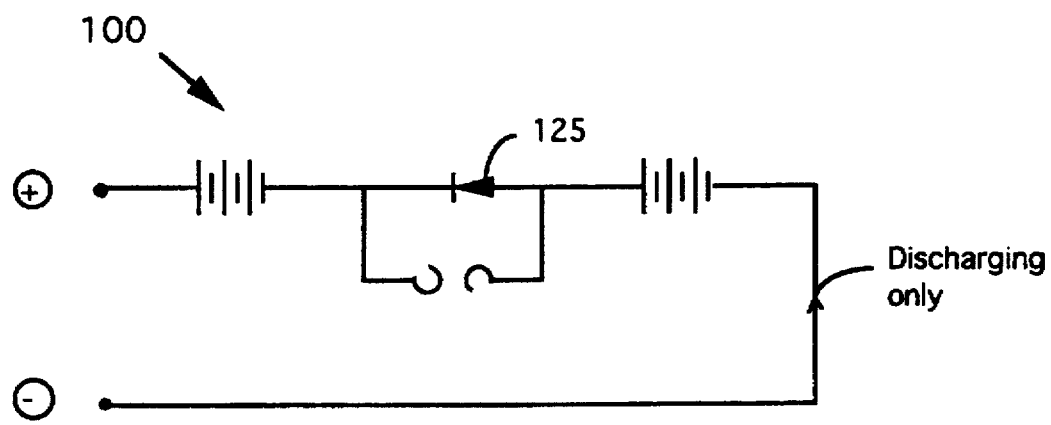
Figure 3:
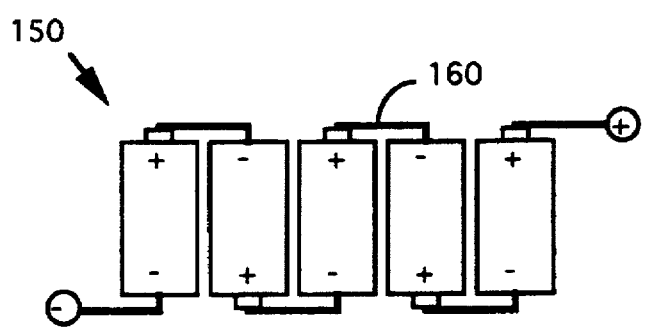
FIG. 3 is a cross sectional view of a rechargeable battery pack implemented with a polyswitch as a temperature limiting device provided with parallel discharging path of the present invention.

FIG. 2B and 2C show the circuit diagrams of the rechargeable battery packs including the temperature limiting device 110 before and after the thermostat 115 is switched off. The non-interrupting operation conductive means 120 including the diode 125 is conducting only in the direction of discharging. As that shown in FIG. 2C, when a limiting temperature is reached in the battery pack which causes the thermostat 115 to switch off, the diode 125 is connected in parallel and ready to provide a discharging current for providing continuous non-interrupting power input to an electrical device powered by this battery pack.

The difficulties faced by the prior art rechargeable batteries are thus resolved by the temperature limiting device 115 of the present invention when implemented with the non-interrupting operation conducting means 120, e.g., a diode 125. The operation of an electronic device, e.g., a notebook computer or a cellular phone, does not have to be suddenly interrupted when the temperature of the rechargeable batteries is raised above certain level. For even though the charging current in the batteries has to be cutoff immediately to prevent undesirable high temperature due to continuous charging operation, a discharging current can be drawn from the alternate path, i.e., the non-interrupting operation conducting means 120, e.g., a diode 125. The discharging current flow therein can therefore be used to operate the electronic device on a continuous basis. The unexpected and sudden interruptions caused by temperature limitations as that occurred in the conventional batteries are thus eliminated by the use of temperature limiting device of this invention.

Using the temperature limiting device of this invention also provides the flexibility to set a lower cutoff temperature for a charging cycle because the concerns of unexpected and sudden interruptions of power supply to operate an electronic device is now resolved. It is no longer necessary to set a high cutoff temperature to avoid frequent interruptions. The batteries can therefore be operated by carrying out the charging and discharging cycles in a lower temperature. The adverse effects caused by higher temperature operation can therefore be eliminated. Longer life of rechargeable batteries can be achieved when the best cutoff temperature for a charging cycle can be set at a level most suitable to each type of batteries. For the commercially available nickel metal hydride (Ni-MH) rechargeable batteries, the normal cutoff temperature at 46 degrees centigrade would be appropriate.

In summary, the present invention includes a thermal protection device for preventing a rechargeable battery 100 from overheating during a charging cycle. The thermal protection device includes a temperature limiting switching means 115 for connecting in series to a charging loop for switching off the charging loop when the rechargeable battery reaches a predefined temperature. The thermal protection device further includes a non-interrupted connecting means 120 for connection in parallel with the charging loop, the connecting means includes a diode 125 connected in series therein for providing a discharging loop for the rechargeable battery 100. In a preferred embodiment, the temperature limiting switching means is a thermostat for switching off the charging loop when the rechargeable battery 100 reaches the predefined temperature. In an alternate preferred embodiment, the thermostat for switching off the charging loop when the rechargeable battery 100 reaches a predefined temperature between 45° C. to 55° C.

Referring to FIG. for a rechargeable battery pack 150 which is implemented with a polyswitch 160 as a temperature limiting device. The poly switch is provided with a thermostat for switching off a charging current and a parallel discharging path including a diode for continuously providing a discharging current when the thermostat is switched off. The polyswitch 160 is implemented as a miniaturized surface mount device applying integrated circuit (IC) fabrication process, e.g., thin film or thick film processes on a insulating substrate. The polyswitch 160 is therefore manufactured with very small dimensions suitable for securely attaching to a battery pack employed in a portable electric device, e.g., a cellular phone, or a pocket size personal digital assistance (PDA) device. For a battery pack 150 as shown which includes five AA batteries, the battery pack 150 is approximately seven centimeters long, five centimeters high with the polyswitch 160 connected to the second and the third batteries from the left wherein the polyswitch having a thickness less than 0.5 millimeters (0.5 mm). This polyswitch 160 can therefore be very conveniently implemented with rechargeable battery packs for gaged electronic devices to provide thermal protection and continuous non-interrupting output power to these devices.

This invention also discloses a polyswitch thermal protection device 160. This polyswitch thermal protection switch includes a temperature limiting switching means for connecting in series to a charging loop for switching off the charging loop when an electric element in the charging loop reaches a predefined temperature. The polyswitch thermal protection device also includes a non-interrupted connecting means for connecting in parallel with the temperature limiting switching means, the non-interrupted connecting means includes a current-limiting means for limiting a current to flow therein only in one direction. In a preferred embodiment, the temperature limiting switching means and the non-interrupted connecting means connected in parallel thereto are integrated on an insulating substrate. In another preferred embodiment, the temperature limiting switching means and the non-interrupted connecting means connected in parallel thereto being integrated on an insulating substrate have a thickness substantially less than one millimeter. In yet another preferred embodiment, the temperature limiting switching means is a thermostat and the non-interrupted connecting means connected in parallel thereto is a diode.

Therefore, the present invention provides a new thermal protection device and method for preventing overheating of rechargeable batteries without power output interruptions thus enabling those of ordinary skill in the art to overcome the difficulties and limitations encountered in the prior art. Specifically, by the use of the new thermal protection device and method which utilizes an non-interrupted connecting means connected in parallel to a temperature limiting switching means such as a thermostat whereby the power output interruptions are eliminated. Furthermore, by the use of this new thermal protection device for providing an non-interrupted connecting means in parallel to a temperature limiting switching means, e.g., a thermostat such that charging cycle cutoff temperature can be set at a lower temperature without concerns for the power output interruptions. Longer battery life is therefore achieved.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A thermal protection device for preventing a rechargeable battery from overheating during a charging cycle comprising:

a temperature limiting switching means for connecting in series to a charging loop for switching off said charging loop when said rechargeable battery reaching a predefined temperature; and a non-interrupted connecting means for connecting in parallel with said charging loop, said connecting means including a diode connected in series therein for providing a discharging loop for said rechargeable battery.

2. The thermal protection device of claim 1 wherein:

said temperature limiting switching means being a thermostat for switching off said charging loop when said rechargeable battery reaching said predefined temperature.

3. The thermal protection device of claim 1 wherein:

said thermostat for switching off said charging loop when said rechargeable battery reaching a predefined temperature between 45° C. to 55° C.

4. A thermal protection device for preventing a rechargeable battery from overheating during a charging cycle comprising:

a thermostat for connecting in series to a charging loop for switching off said charging loop when said rechargeable battery reaching a predefined temperature;

a non-interrupted connecting means for connecting in parallel with said charging loop, said connecting means including a diode connected in series therein for providing a discharging loop for said rechargeable battery; and said thermostat for switching off said charging loop when said rechargeable battery reaching a predefined temperature between 45° C. to 55° C.

5. A polyswitch thermal protection device comprising:

a temperature limiting switching means for connecting in series to a charging loop for switching off said charging loop when an electric element in said charging loop reaching a predefined temperature; and a non-interrupted connecting means for connecting in parallel with said temperature limiting switching means, said non-interrupted connecting means including a current-limiting means for limiting a current to flow therein only in one direction.

6. The polyswitch thermal protection device of claim 5 wherein said temperature limiting switching means and said non-interrupted connecting means connected in parallel thereto are integrated on an insulating substrate.

7. The polyswitch thermal protection device of claim 6 wherein said temperature limiting switching means and said non-interrupted connecting means connected in parallel thereto being integrated on an insulating substrate having a thickness substantially less than one millimeter.

8. The polyswitch thermal protection device of claim 5 wherein said temperature limiting switching means includes a thermostat and said non-interrupted connecting means connected in parallel thereto includes a diode.

* * * * *